United States Patent Office 3,527,732
Patented Sept. 8, 1970

3,527,732
AROMATIC POLYAMIDES PREPARED FROM AROMATIC DIAMINES CONTAINING QUINAZOLINDIONE RINGS
Gerhard Dieter Wolf and Wolfgang Giessler, Dormagen, Francis Bentz, Cologne, and Günther Nischk, Dormagen, Germany, assignors to Farbenfabriken Bayer Aktiengesellschaft, Leverkusen, Germany, a corporation of Germany
No Drawing. Filed Oct. 22, 1968, Ser. No. 769,704
Claims priority, application Germany, Nov. 28, 1967, F 54,138
Int. Cl. C08g 20/20
U.S. Cl. 260—47
8 Claims

ABSTRACT OF THE DISCLOSURE

Aromatic polyamides for the production of films, foils, filaments and bristles showing outstanding thermal and mechanical properties are produced by reaction of aromatic dicarboxylic acid dihalides with aromatic diamines containing one or two 2,4-(1H,3H)-quinazolindione ring systems separated by aromatic radicals in polar organic solvents.

---

This invention relates to temperature-resistant, readily soluble aromatic polyamides and to a process for the production of these aromatic polyamides by reacting aromatic dicarboxylic acid dihalides with aromatic diamines containing a 2,4-(1H,3H)-quinazolindione ring system.

It is known that high-melting polyamides can be obtained by condensing aromatic dicarboxylic acid dihalides, such as isophthalic acid dichloride, with aromatic diamines, such as m-phenylene diamine.

It is also known that high polymers showing good thermal properties can be obtained from diaminodiphenyl oxadiazoles or triazoles and aromatic dicarboxylic acid dihalides in solvents for polyamides, such as dimethyl acetamide. The disadvantage of the polyamides in question is that they are almost insoluble. For this reason, alkali metal halides or alkaline earth metal halides, such as lithium chloride, calcium chloride or magnesium bromide, have to be added to the polycondensation mixtures in concentrations of up to 10% by weight as solution promoters.

It is an object of this invention to provide readily soluble aromatic polyamides consisting essentially of the recurring structural unit

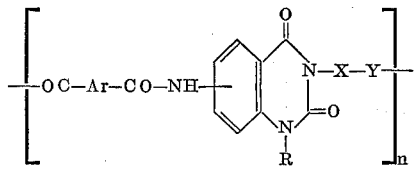

wherein $n$ represents an integer from 10 to 200, X represents a bivalent aromatic radical consisting of one or more condensed rings or aromatic rings that are linked together through a single bond or through a —CH$_2$—, —O—, —S— or —SO$_2$-group, and alkyl- or halogen-substituted derivatives of said aromatic radical, R represents hydrogen or a C$_1$–C$_4$ alkyl radical, Ar represents a bivalent aromatic radical and Y represents the group —NH— or

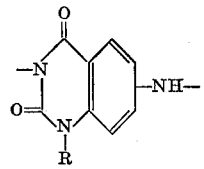

said polyamides having a relative solution viscosity $\eta_{rel.}$ of 1.0 to 2.8 (as measured on a 0.5% by weight solution of the polymer in dimethyl formamide at 20° C. in an Ubbelohde viscosimeter) and a softening range above 250° C. They combine a high level of thermal stability with outstanding solubility in polar organic solvents.

It is another object of this invention to provide a process for the production of these aromatic polyamides which comprises reacting an aromatic dicarboxylic acid dihalide with an aromatic diamine containing one or two 2,4-(1H,3H)-quinazolidone ring system separated by aromatic radicals, said reacting being effected in a polar organic solvent at temperatures in the range from —30 to +150° C.

Aromatic diamines containing one or two 2,4-(1H,3H)-quinazolindione ring systems separated by aromatic radicals, that are suitable for use in the process according to the invention include, for example, diamines of the kind that can be obtained by reacting nitroanthranilic acid esters or their N-monosubstitution products, with aromatic isocyanates containing a nitro group in a molar ratio of 1:1, followed by a ring-closure to form the dinitro quinazolindiones and ultimately by reduction of the nitro groups.

Ring-closure to form the 2,4-(1H,3H)-quinazolindiones is carried out thermally on the dinitro urea compound in a high boiling solvent, optionally in the presence of a catalyst.

Other suitable diamines include those of the kind that can be obtained, as known per se, by reacting 4- or 5-nitro anthranilic acid or 4- or 5-nitroanthranilic acid esters, or their N-monosubstitution products, with aromatic diisocyanates in a molar ratio of 2:1, followed by ring-closure to form the dinitro compounds containing quinazolindione rings and ultimately by reduction of the nitro groups. In this instance, too, ring-closure of the dinitro urea compound to form the 2,4-(1H,3H)-quinazolindiones is carried out thermally in a high boiling solvent, optionally in the presence of a catalyst (preferably pyridine). When free nitroanthranilic acids are used as starting materials, they are initially reacted in the form of their alkali metal salts to form the urea derivatives, subsequently converted into the free acid and preferably cyclised in a medium that absorbs water, such as acetic anhydride.

It is also possible, however, to use the non-ring-closed diamino urea compounds for the polycondensation reaction. In this case, ring-closure is subsequently completed on the polymer.

The following are examples of anthranilic acids or anthranilic acid esters that may be used to prepare the diamines containing one or two 2,4-(1H,3H)-quinazolindione systems: 4- or 5-nitroanthranilic acid; 4- or 5-nitroanthranilic acid methyl ester; 4- or 5-nitroanthranilic acid ethyl ester; 4- or 5-nitroanthranilic acid butyl ester; 4- or 5-nitro-2-methyl aminobenzoic acid methyl ester; 5-nitro-2-phenyl aminobenzoic acid methyl ester; and 5-nitro-2-chloro ethyl aminobenzoic acid ethyl ester.

The following are examples of isocyanates which may be used in the preparation of the diamino quinazolindiones and which are obtained in solution by known methods and do not have to be isolated: p- and m-nitrophenyl isocyanate; 5-nitro-1-naphthalene isocyanate; 5-nitro-2-naphthalene isocyanate; 4-nitro-4'-biphenylene isocyanate; 4-nitro-4'-diphenyl ether isocyanate; 4-nitro-4'-diphenyl sulphone isocyanate; 4-nitro-2-chloro-4'-diphenyl ether isocyanate; and 4-nitro-3'-chloro-4'-diphenyl ether isocyanate.

The following are examples of diisocyanates that may be used in the preparation of the diamines containing two 2,4-(1H,3H)-quinazolindione systems separated by aromatic radicals: m- or p-phenylene diisocyanate; naphthylene-1,5-diisocyanate; naphthylene-2,7-diisocyanate; biphenylene-4,4'-diisocyanate; 1,4 - bis-(p-isocyanatophenoxy)-benzene; 4,4'-bis-(p-isocyanatophenoxy)-diphenyl sulphone; and 4,4'-diphenyl ether diisocyanate.

Reaction of the nitroanthranilic acid esters with the aromatic isocyanates to form the dinitro urea compounds, and reaction of the nitroanthranilic acid esters or alkali metal salts of the nitroanthranilic acids with the aromatic diisocyanates to form the diurea compounds, are carried out by known methods in inert solvents.

The following are examples of aromatic dicarboxylic acid dihalides suitable for use in the process according to the invention: diphenyl-4,4'-dicarboxylic acid dichloride; naphthalene-1,5-dicarboxylic acid dichloride; sulphonyl dibenzoic acid-4,4'-dichloride; isophthaloyl dichloride, terephthaloyl dichloride and the corresponding dibromides; and the alkyl- and halogen-substitution products of the above-mentioned acid halides.

Polycondensation of the aromatic diamine containing one or two 2,4-(1H,3H)-quinazolindione systems, with the aromatic dicarboxylic acid dihalides is preferably carried out in polar organic solvents such as N,N'-dialkyl carboxylic acid amides, for example dimethyl acetamide, or N-substituted lactams, for example N-methyl pyrrolidone. The advantage of these solvents is that it is possible to operate in the absence of additional acid acceptors.

In order to obtain reaction products of the highest possible molecular weight, it is of advantage to use the starting products in equimolar quantities, although in principle polycondensation may also be carried out with an excess of one of the two components up to about twice the molar quantity. Condensation is carried out at a temperature in the range from −30 to +150° C. and preferably at a temperature in the range from −10 to +30° C. The reaction time may be from 1 to 30 hours. The solutions have solids contents of from 5 to 40% by weight and preferably from 15 to 25% by weight.

When non-cyclised diamino urea compounds are used for the polycondensation reaction, the polymers are subjected, after forming, to heat treatment at temperatures above 200° C. either in vacuo or at normal pressure. This completes ring-closure to form the 2,4-(1H,3H)-quinazolindione groups.

In addition to their outstanding resistance to high temperatures, the polyamides according to the invention containing 2,4-(1H,3H)-quinazolindione also show high solubility in polar organic solvents. They may therefore readily be processed and may be used for the production of films, foils, filaments and bristles showing outstanding thermal and mechanical properties.

The relative solution viscosities $\eta_{rel.}$ given in the following examples were measured on a 0.5% by weight solution of the polymer in dimethyl formamide at 20° C. using an Ubbelohde viscosimeter.

The following examples are to further illustrate the invention without limiting it.

EXAMPLE 1

180 parts by weight of 3-[4'-(p-aminophenoxy)-phenyl]-7-amino-2,4-(1H,3H)-quinazolindione were dissolved in 850 parts by weight of N-methyl pyrrolidone. 101.5 parts by weight of isophthalic acid dichloride were then added in small portions with continuous stirring at 0 to 10° C. On completion of the addition, the clear highly viscous solution was stirred for 6 hours at room temperature, after which the polymer was precipitated with water, washed free of hydrochloric acid and dried. Filaments can be spun and films cast from solution of this polymer. These polyamide films did not show any signs of brittleness after storage for 6 weeks at 275° C. After treatment for 12 hours at 275° C., they were still soluble in dimethyl formamide. The polymers have a softening point of above 355° C. $\eta_{rel.}=1.764$.

3 - [4' - (p - aminophenoxy)-phenyl]-7-amino-2,4-(1H,3H)-quinazolindione melting at 291 to 292° C. was obtained by catalytically reducing the corresponding dinitro compound (melting point 330 to 331° C.) which in turn was prepared by reacting 4-nitroanthranilic acid methyl ester with 4-nitro-4'-diphenyl ether isocyanate, followed by ring-closure under the influence of pyridine.

EXAMPLE 2

134 parts by weight of 3-p-aminophenyl-7-amino-2,4-quinazolindione were dissolved in 700 parts by weight of absolute N-methyl pyrrolidone. 101.5 parts by weight of isophthalic acid dichloride were added in portions to the resulting solution with continuous stirring at 0 to 10° C. On completion of the addition, the clear highly viscous solution was stirred for 5 hours at room temperature, and then wet-spun in water into filaments. These filaments have a strength of 4.9 to 5.4 g./den. at an elongation of 8 to 10%. The thermal stability of the polyamide filaments is characterised by the following heat-treatment table:

| Duration of heat treatment in hours | Temperature, ° C. | Residual strength, percent |
|---|---|---|
| 500 | 200 | 87 |
| 500 | 250 | 50 |
| 500 | 275 | 30 |
| 300 | 300 | 20 |
| 100 | 350 | 15 |

Xenotest: after 200 hours. 40% residual strength. $\eta_{rel.}:2.105$ 3-p-aminophenyl - 7 - amino - 2,4 - quinazolindione, melting at temperatures above 360° C., was obtained by catalytically reducing the corresponding dinitro compound (melting point 339 to 341° C.) which in turn was obtained from 4-nitroanthranilic acid methyl ester and p-nitrophenyl isocyanate, in the same manner as the dinitro compound of Example 1.

EXAMPLE 3

114.3 parts by weight of 4,4'-sulphonyl dibenzoic acid dichloride were added in portions at 5 to 10° C. to a solution of 120 parts by weight of 3-[4'-(p-aminophenoxy)-phenyl]-7 - amino-2,4-quinazolindione in 703 parts by weight of N-methyl pyrrolidone. After stirring for several hours at room temperature, the resulting clear highly viscous solution was poured into water and the polyamide which was precipitated was washed free of hydrochloric acid and dried.

Films could be cast and filaments spun from solutions of this polyamide ($\eta_{rel.}=1.526$, softening point above 355° C.). The films did not show any signs of brittleness after storage for 4 weeks at 275° C. After treatment for 15 hours at 275° C., the films were still soluble in dimethyl formamide or N-methyl pyrrolidone.

EXAMPLE 4

50.75 parts by weight of terephthalic acid dichloride were introduced in small portions at a temperature of 5 to 10° C. into a solution of 70.5 parts by weight of 1-methyl - 3 - p - amino-phenyl-7-amino-2,4-quinazolindione in 363 parts by weight of N-methyl pyrrolidone. The resulting clear highly viscous solution was stirred for 6 hours at room temperature, after which the polymer was precipitated by pouring into water, washed free of hydrochloric acid and dried. Films cast from solutions of these polymers did not turn brittle after treatment at 275° C. for 4 weeks. Softening point above 355° C. $\eta_{rel.}=1.370$.

The diamine used, having a melting point above 350° C., was obtained by reacting 5-nitroanthranilic acid methyl ester with p-nitrophenyl isocyanate, followed by cyclisation, methylation and reduction in that order.

EXAMPLE 5

Following the procedure of Example 4, 67 parts by weight of 3-p-aminophhenyl-6-amino-2,4-quinazolindione were reacted with 51 parts by weight of isophthalic acid dichloride in N-methyl pyrrolidone and the resulting polymer having a softening point above 355° C. and $\eta_{rel.} = 1.515$, was converted into films. The films had not turned brittle after storage for 5 weeks at 275° C. Even after treatment at 275° C. for 12 hours, they were still soluble in dimethyl formamide and N-methyl pyrrolidone. The 3-p-aminophenyl - 6 - amino - 2,4-quinazolindione used was obtained by catalytic reduction of the corresponding dinitro compound (melting point 318 to 320° C.) which in turn was prepared by reacting 5-nitro anthranilic acid methyl ester with p-nitrophenyl isocyanate, followed by ring-closure under the influence of pyridine.

EXAMPLE 6

75.2 parts by weight of a diamine corresponding to the formula

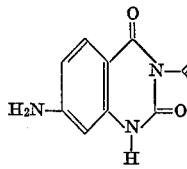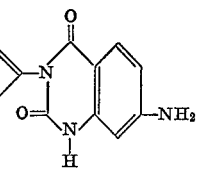

were dissolved in 287 parts by weight of absolute N-methyl pyrrolidone and 20.3 pars by weight of isophthalic acid dichloride were added in portions to the resulting solution with continuous stirring at a temperature of from 0 to 5° C. On completion of the addition, the viscous solution was stirred for 6 hours at room temperature, after which the polymer was precipitated with water, washed free of hydrochloric acid and dried. Filaments could be spun and films cast from solutions of this polymer. Even after storage for 12 hours at 250° C., they were still soluble in polar organic solvents.

The films did not show any signs of brittleness after storage for 5 weeks at 250° C. The polyamide had a softening point above 350° C. and a relative solution viscosity $\eta_{rel.}$ of 1.533.

The diamine used, melting at 262 to 265° C., was obtained by reacting 4-nitroanthranilic acid methyl ester with 4,4 - bis - (p - isocyanatophenoxy)-diphenyl sulphone in a molar ratio of 2:1, followed by ring-closure in o-dichlorobenzene/pyridine (20:1) to form the dinitro diquinazolindione derivative (melting point 355 to 359° C.) followed by catalytic hydrogenation.

EXAMPLE 7

110 parts by weight of the diamine described in Example 6 were dissolved in 480 parts by weight of N-methyl pyrrolidone 29.7 parts by weight of terephthalic acid dichloride were added in small portions with stirring at 0 to 5° C. After stirring for several hours, the highly viscous solution was directly spun by the wet-spinning process (in water). The stretched filaments had an ultimate tensile strength of 3.3 g./den. at 18% elongation. The polymer had a relative solution viscosity $\eta_{rel.}$ of 2.205 and a softening point above 350° C.

EXAMPLE 8

61.2 parts by weight of a diamine corresponding to the formula

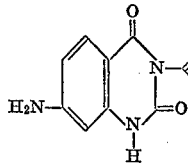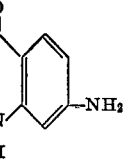

were dissolved in 245 parts by weight of N-methyl pyrrolidone, and 20.3 parts by weight of isophthalic acid dichloride were added in small portions to the resulting solution with stirring at a temperature of from 0 to 5° C. The resulting highly viscous solution was stirred for several hours at room temperature, after which the polyamide was precipitated with water, washed free of hydrochloric acid and dried. Filaments and films could be prepared from solutions of this polymer which, in addition to an outstanding resistance to high temperatures (no signs of brittleness after 5 weeks at 250° C.), were also readily soluble in polar organic solvents after 12 hours heat treatment. Softening point of the polymer: above 350° C., $\eta_{rel.} = 1.458$.

The diamine used, having a melting point above 360° C., was obtained by reacting 4-nitroanthranilic acid methyl ester with 1,4-bis-(p-isocyanatophenoxy)-benzene in a molar ratio of 2:1, followed by cyclisation in o-dichlorobenzene/pyridine (20:1) to form the dinitro diquinazolindione derivative (melting point above 360° C.), followed by catalytic reduction of the nitro groups.

EXAMPLE 9

45.6 parts by weight of a diamine corresponding to the formula

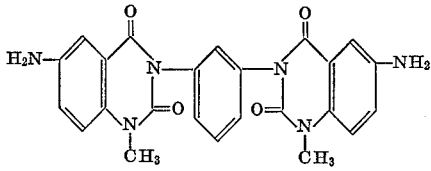

were dissolved in 220 parts by weight of absolute N-methyl pyrrolidone, and 34.3 parts by weight of sulphonyl dibenzoic acid 4,4'-dichloride were added to the resulting solution with continuous stirring at a temperature from 0 to 5° C. On completion of the addition, the viscous solution was stirred for 6 hours at room temperature and the polyamide was precipitated by pouring the solution into water, washed free of hydrochloric acid and dried. Films could be cast from solutions of this polymer. They showed no signs of brittleness after storage for 5 weeks at 250° C. Softening point: above 350° C., $\eta_{rel.} = 1.402$.

The diamine used, having a melting point above 350° C., was obtained by reacting 5-nitroanthranilic acid methyl ester with m-phenylene diisocyanate, followed by cyclisation, methylation and reduction in that order.

What we claim is:

1. An aromatic polyamide consisting essentially of the recurring structural unit:

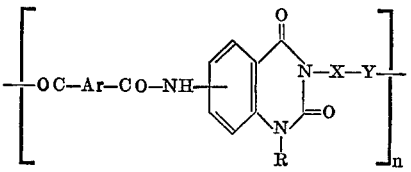

wherein n is an integer from 10 to 200; X represents a bivalent aromatic radical selected from the group consisting of phenylene, naphthylene, biphenylene, biphenylene ether, mono chloro biphenylene ether, biphenylene sulfone, and bis(phenoxy) biphenylene sulfone, and bis(phenoxy) phenylene; R represents hydrogen or a $C_{1-4}$ alkyl radical; Ar represents a bivalent aromatic radical selected from the group consisting of diphenylene, naphthylene, diphenylene sulfone, phenylene, and the alkyl- or halogen- substituted products of said member Ar; and Y represents a member selected from the group consisting of —NH— and

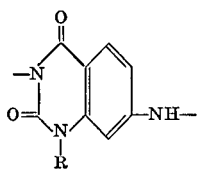

said polyamides having a relative solution viscosity $\eta_{rel.}$ of from 1.0 to 2.8 (as measured on a 0.5% by weight solution of the polymer in dimethyl formamide at 20° C., in an Ubbelohde viscosimeter) and a softening range above 250° C.

2. The polyamide of claim 1 wherein Ar is phenylene, R is hydrogen, X is phenylene, and Y is NH.

3. The polyamide of claim 2 with the formula:

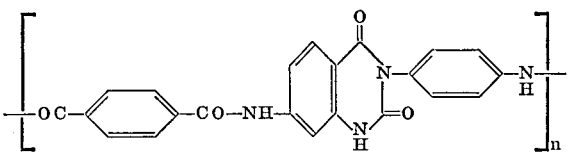

4. The polyamide of claim 1 wherein Ar is phenylene, R is hydrogen, X is diphenylene ether, and Y is NH.

5. The polyamide of claim 4 with the formula:

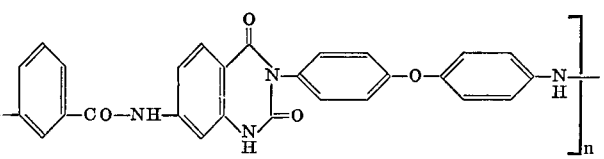

6. A process for the production of aromatic polyamides which consists essentially of reacting an aromatic dicarboxylic acid dihalide selected from the group consisting of diphenyl-4,4'-dicarboxylic acid dichloride, naphthalene-1,5-dicarboxylic acid dichloride, sulphonyl dibenzoic acid-4,4'-dichloride, isophthaloyl dichloride, terephthaloyl dichloride, the corresponding bromides, and the alkyl- and halogen-substitution products thereof with an aromatic diamine selected from the group consisting of:

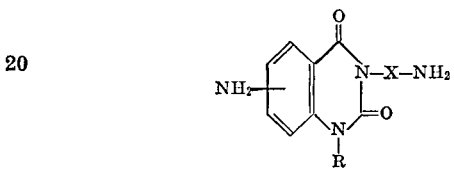

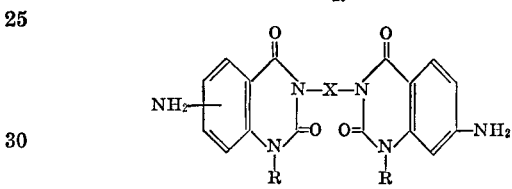

wherein R is hydrogen or a $C_{1-4}$ alkyl radical and X is selected from the group consisting of phenylene, naphthylene, biphenylene, biphenylene ether, mono chloro biphenylene ether, biphenylene sulfone, bis(phenoxy) biphenylene sulfone, and bis(phenoxy) phenylene, said reacting being effected in a polar organic solvent at temperatures in the range from −30° to +150° C.

7. The process of claim 6 wherein the polar organic solvent is N,N'-dialkylcarboxylic acid amide.

8. The process of claim 6 wherein the polar organic solvent is an N-substituted lactam.

References Cited

UNITED STATES PATENTS 3,094,511   6/1963   Hill et al. _____ 260—78
3,376,268   4/1968   Preston _____ 260—78

WILLIAM H. SHORT, Primary Examiner

L. L. LEE, Assistant Examiner

U. S. Cl. X.R.

260—32.4, 32.6, 78